(12) United States Patent
Yilmaz

(10) Patent No.: US 7,407,207 B2
(45) Date of Patent: Aug. 5, 2008

(54) PET WASTE REMOVAL SCOOPER

(76) Inventor: Lufti Yilmaz, 1599 York Ave., #5N, New York, NY (US) 10028

( * ) Notice: Subject to any disclaimer, the term of this patent is extended or adjusted under 35 U.S.C. 154(b) by 259 days.

(21) Appl. No.: 11/213,034

(22) Filed: Aug. 25, 2005

(65) Prior Publication Data
US 2007/0046045 A1  Mar. 1, 2007

(51) Int. Cl.
A01K 29/00 (2006.01)
E01H 1/12 (2006.01)

(52) U.S. Cl. ..................................... 294/1.4
(58) Field of Classification Search ................ 294/1.1, 294/1.3, 1.4, 1.5, 55; 15/257.1
See application file for complete search history.

(56) References Cited

U.S. PATENT DOCUMENTS 3,819,220 A * 6/1974 Bredt .......................... 294/1.5
4,003,595 A * 1/1977 Fano et al. .................... 294/1.5
4,056,278 A * 11/1977 Bau et al. ..................... 294/1.4
4,466,647 A * 8/1984 Spevak ........................ 294/1.5
4,819,977 A * 4/1989 Cooper ........................ 294/1.4
4,878,703 A * 11/1989 Yoshioka .................... 294/1.5
6,471,267 B2 * 10/2002 Asazuma .................... 294/1.5

FOREIGN PATENT DOCUMENTS

DE      3809286    *  9/1989
JP      06-033429  *  2/1994

* cited by examiner

Primary Examiner—Dean J Kramer
(74) Attorney, Agent, or Firm—Gottlieb, Rackman & Reisman

(57) ABSTRACT

A device for collecting refuse from an animal includes a cylindrical housing a plurality of longitudinal slots holding the lips of a plurality of disposable bags. The device also includes a frame formed of relatively stiff elements connected end to end and holding the lips of a bag. The frame can be shifted between an open configuration in which the bag is opened so that it can be filled, and a folded configuration. The frame is stored in a sleeve inside the housing and both the sleeve and the frame can be extended from the housing by a rod operated by a user.

9 Claims, 6 Drawing Sheets

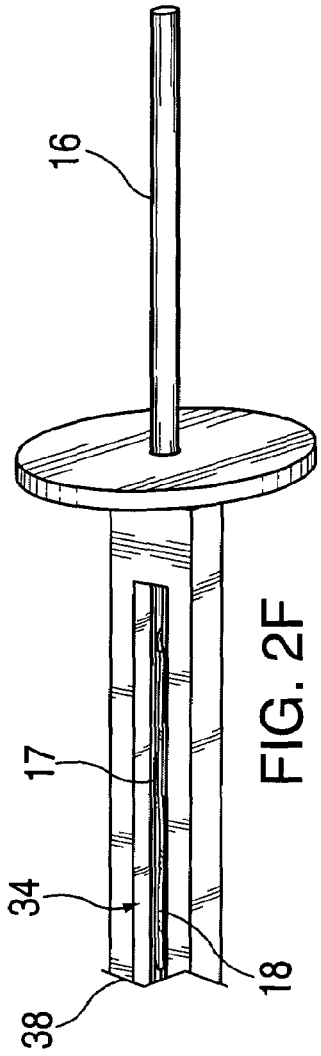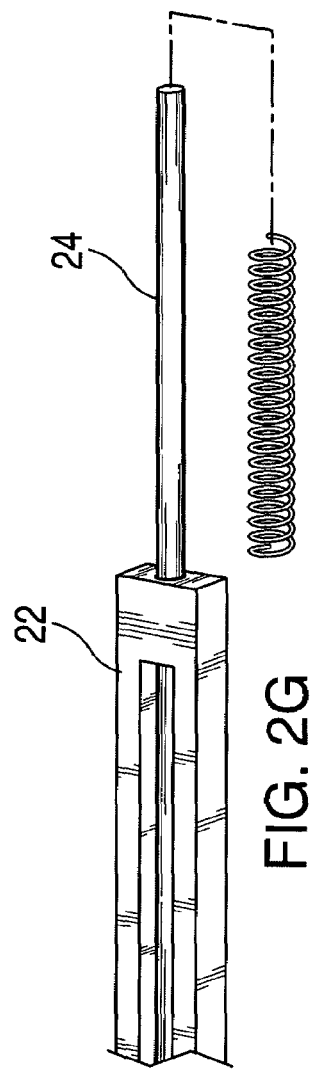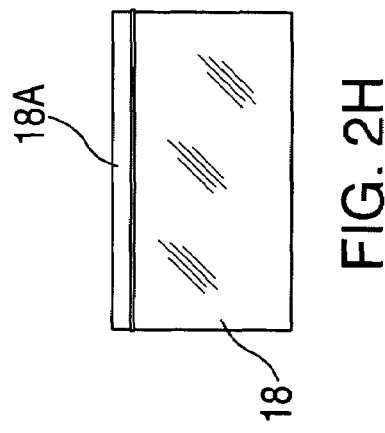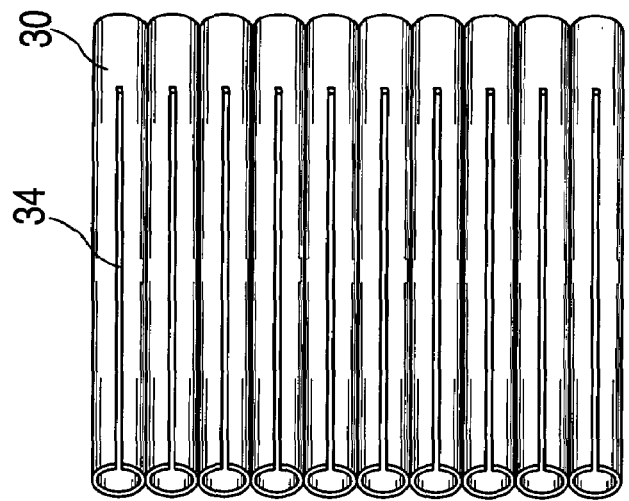

19

PET WASTE REMOVAL SCOOPER

RELATED APPLICATIONS

None.

BACKGROUND OF THE INVENTION

A. Field of Invention

This application pertains to a novel device for removing pet waste, for example, the waste from a dog. The device includes a tubular body housing several bags, a folded frame and a reciprocating rod that can be used to selectively extend the frame with one of bags. The bag is then filled and discarded.

B. Description of the Prior Art

Scoopers for pet waste are available in various shapes and sizes. A common scooper consists of a rod with hoop holding a plastic bag. The bag is filled and it is then removed from the hoop. One problem with this arrangement is that it is rather messy and unsanitary to use. Another problem is that it can hold only a single bag that must be replaced, once used.

Other scoopers consist of two elongated members connected in their mid-section so that they pivot with respect to each other. The top ends of the members are shaped so that they can held with two hand, while the bottom ends cooperate to form a grabbing member that can be used to pick up refuse. The bag for the refuse must be provided and held by another person, or the refuse must be transferred into another appropriate receptacle. Again, the whole process is very messy and unsanitary.

Yet other scoopers consist of a shovel and broom combination. The elements are not connected and the broom is used to simply move the refuse onto the shovel. The refuse is then discarded into a bag or receptacle.

SUMMARY OF THE INVENTION

A device for collecting animal refuse constructed in accordance with this invention to thereby remove and dispose of pet waste includes a cylindrical housing with a plurality of internal longitudinal slots, each slot holding the lips of a disposable bag. Also within the housing there is a sleeve with a longitudinal opening. One of the bags passes through the opening and its lips are engaged by a frame disposed within the sleeve. The frame is formed of several linear elements connected end to end and biased by spring coils toward a polygonal configuration. The device is further provided with a rod, a piston and a piston arm that can be manipulated by a user during the waste collection and disposal process. First, the sleeve with the frame is extended or pushed out of the housing. Next, using the piston, the frame holding the bag is expelled from the sleeve. As the frame exits from the sleeve, the spring coils bias it toward its polygonal shape. (For example, if the frame has six elements, then the frame becomes hexagonal). This action in turn causes the bag to open to receive the refuse.

When the user is finished, he or she closes the frame and then discards the bag. The frame can now be withdrawn within the sleeve into the housing. As this process takes place, the frame is automatically rotated to be reloaded with another bag from the housing.

BRIEF DESCRIPTION OF THE INVENTION

FIGS. 2A-2G show individual external elements of the device of FIG. 1;

FIG. 2H shows a detailed view of an individual bag;

FIGS. 6A-F show details of the internal elements of the device; and

Figure 7:
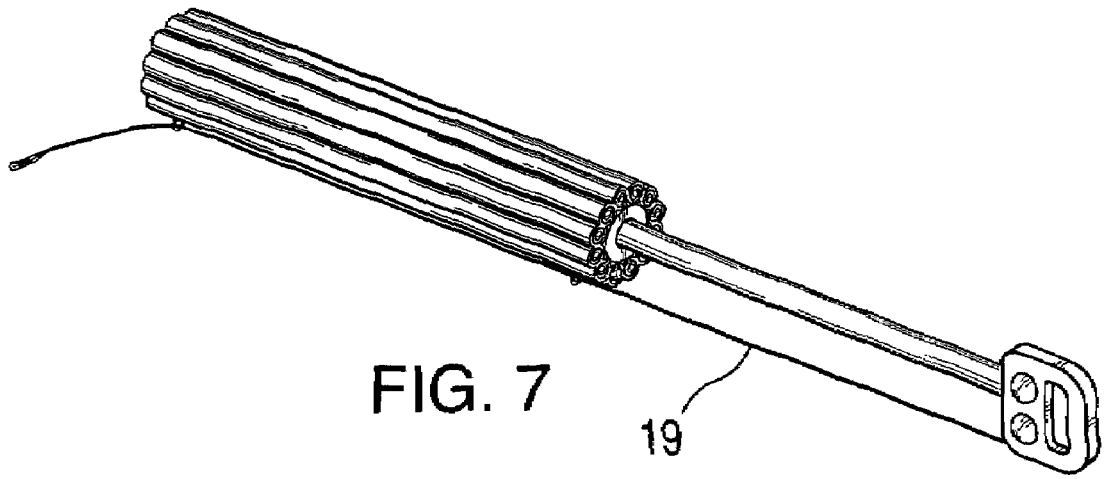

FIG. 7 shows the closed device with the full bag removed.

DETAILED DESCRIPTION OF THE INVENTION

Figure 1:
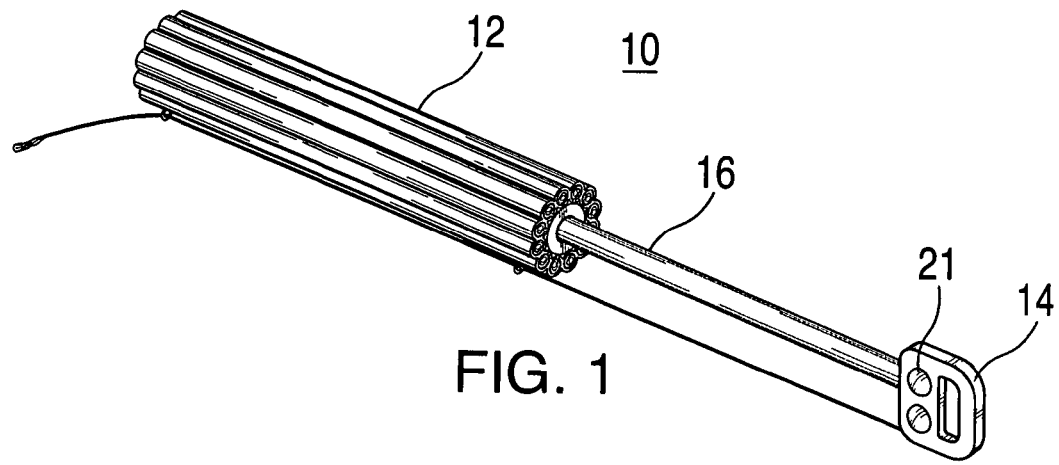
FIG. 1 shows an orthogonal view of a device constructed in accordance with this invention, the device being in a closed position.

Referring first to FIG. 1, a device 10 constructed in accordance with this invention includes a cylindrical body 12, a handle 14 and a rod 16 including a sleeve 17 coextensive with rod 16. The handle is used to reciprocate the rod 16 in and out of the body 12 as described in more detail below. Within the body 12 there are stored a plurality of empty, folded bags 18. For this purpose, the body 12 is formed with a plurality of cylindrical compartments 30, each compartment storing a bag 18. The compartments have a slit opening to the interior of the body 12. Typically, about six to twelve such bags 18 stored in respective compartments 30. Preferably, the bags are wrapped around or rolled up so that they can fit in the respective compartments but can be easily removed therefrom.

Figure 3:
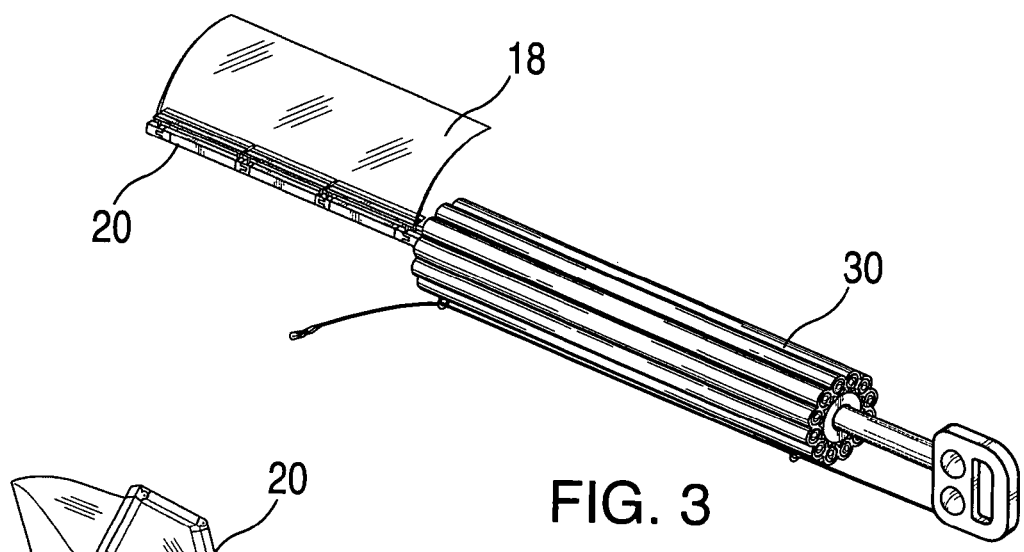
FIG. 3 shows an orthogonal view of the device with a bag being deployed.

One bag 18 is supported by a frame normally disposed inside the body 12. When the body 12 is pulled up toward the handle 14, the frame with the bag extends out of the body 12 as shown in FIG. 3 with the bag 18.

Figure 4:
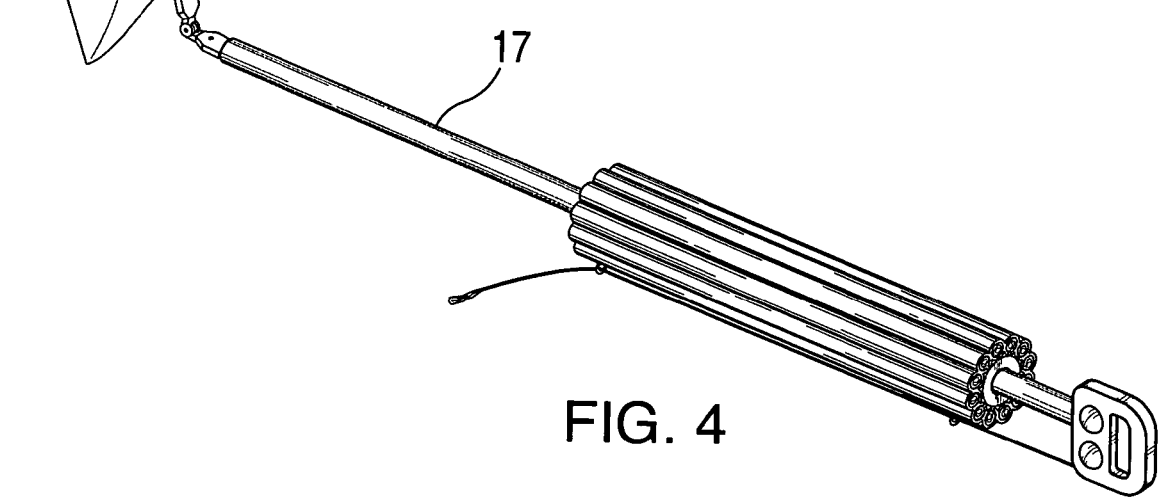
FIG. 4 shows an orthogonal view of the device with the bag being opened.
Figure 2:
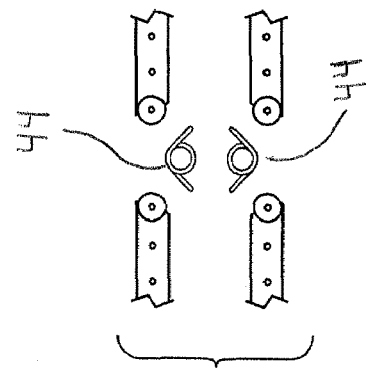
FIG. 2 shows a detail view of the internal element of the device.

As shown in FIG. 4, a frame 20 is engaged with one of the bags 18 of device 10 when the rod 16 is advanced into the body 12. The frame 20 is initially folded within the sleeve 17. As the rod 16 is advanced into the body 12, the sleeve 17, frame 20 and a bag 18 are all telescopically expelled at the other end. A piston 22 with a piston end 24 is slidably disposed with the sleeve 17.

Figure 6B:
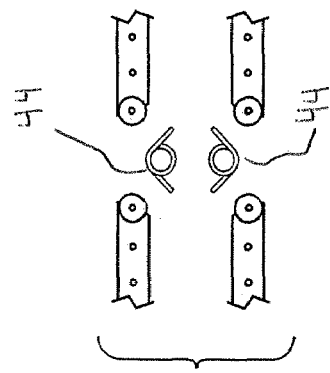
Figure 6C:
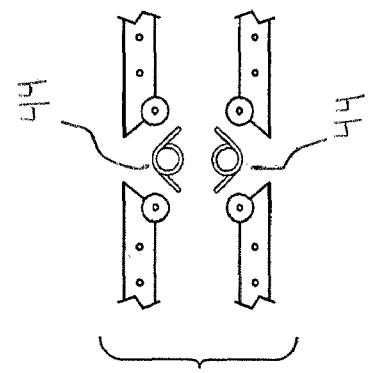
Figure 6A:
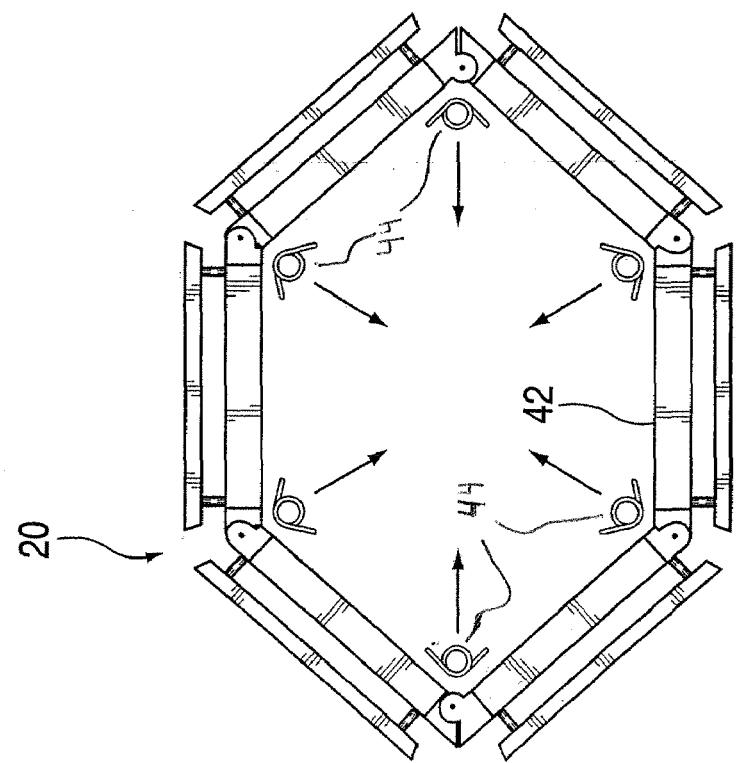
Figure 2B:
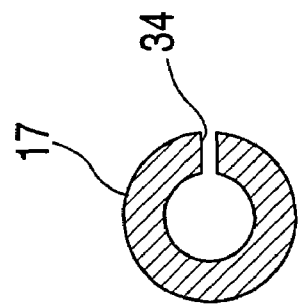
Figure 2D:
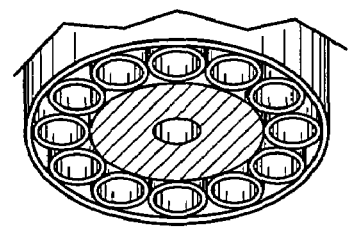
Figure 2A:
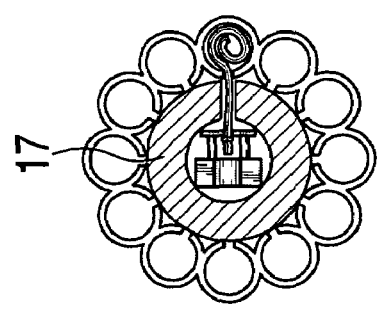
Figure 2C:
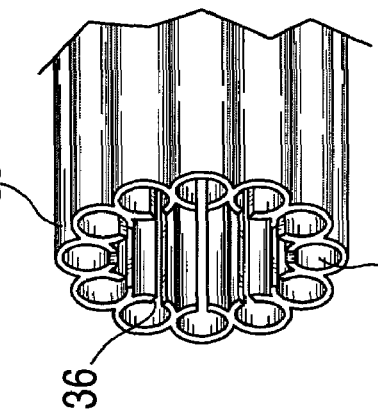

Details of the frame 20 are shown in FIGS. 6A-F. The frame 20 consists of six stiff elements 42 pivotably connected to each other end to end. Coil springs 44 are attached at the corners of the elements 42 and are used to bias the elements 42 to a hexagonal configuration, as shown in FIG. 6A. FIG. 6B shows a first configuration for the ends of the elements 42 and how they are connected by springs 44, and FIG. 6C shows a second configuration for the element ends.

Figure 6D:
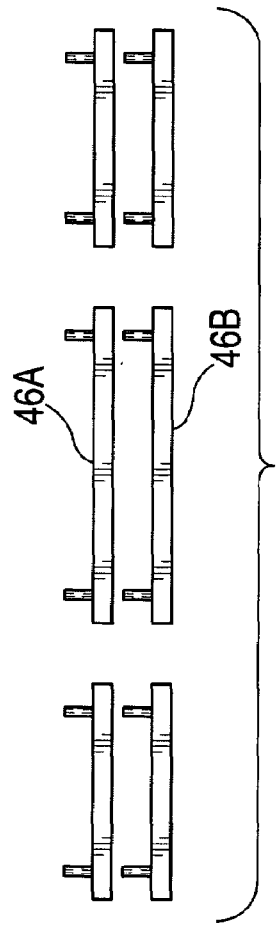
Figure 6E:
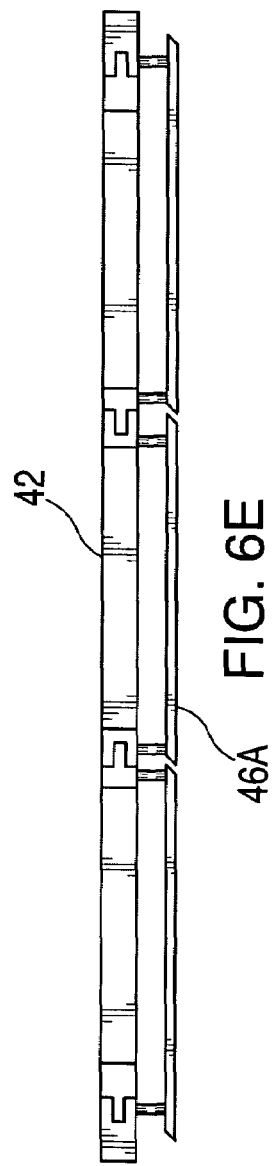
Figure 6F:
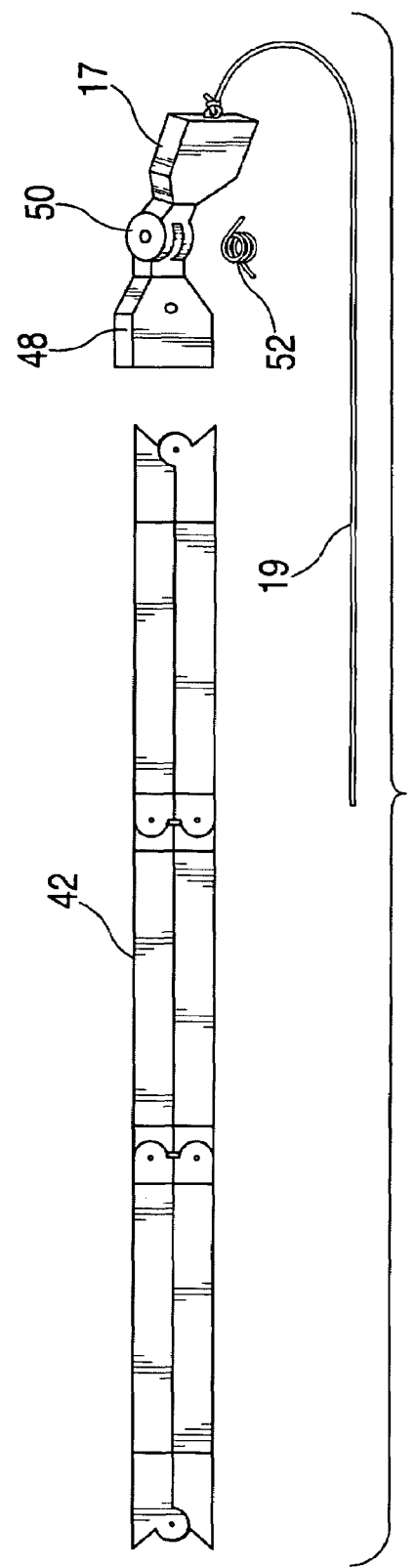

Each element 42 carries a pair of rods 46A, 46B shown in FIG. 6D. The rods are used to engage and hold the open edges of bag 18. FIGS. 6E and 6F show the configuration of the frame 20 when folded and stored inside housing 12. One end of the frame is coupled to sleeve 17 and a string or wire 19 that extends through the sleeve to a handle 14. The frame 20 is attached to the sleeve 17 through an extension 48 and a hinge 50. The hinge 50 by a spring 52 to position the frame 20 at a predetermined angle with respect to sleeve 17.

Referring now to FIGS. 1. 3, 4, 5 and 7, initially, (FIG. 1), the frame 20 is inside the body 12. To operate the device, a user pushes a button 21 on the handle 14. A spring associated with the rod 16 causes the body 12 to be pulled up toward the handle 14. This action causes the frame 20 to extend out of the body 12 (FIG. 3) with its bag 18. Next, the sleeve (also spring loaded) deploys from the body 12 as well causing it to move the frame 20 even further from the handle 14. As part of this motion, the frame 20 is released so that it opens up into a hexagonal shape with the frame rods 46 holding the edges of the bag 18 to keep it open, as shown. The frame 20 and the bag 18 are also angled, as shown in FIG. 4 with respect to sleeve 17. In this configuration, the bag is ready to be used. The whole operation resembles the opening of an automatic umbrella.

Figure 5:
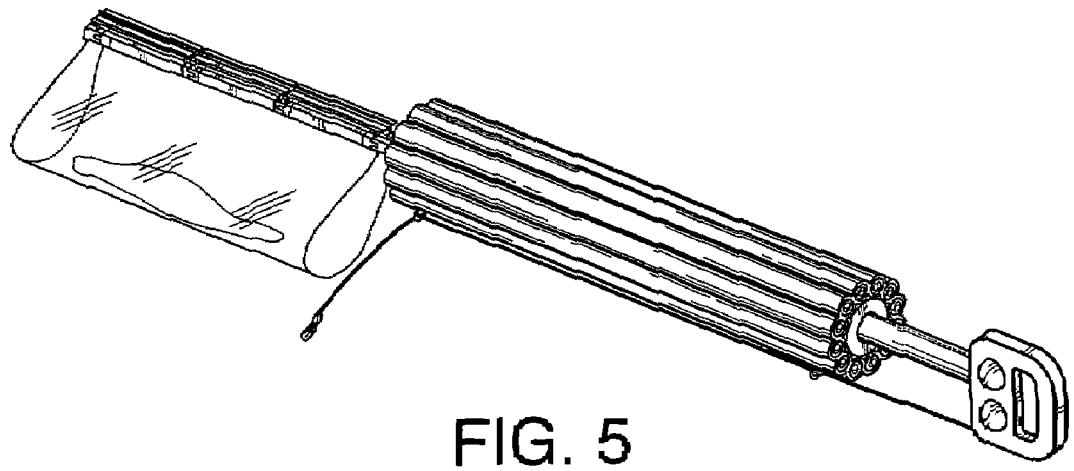
FIG. 5 shows an orthogonal view of the device with the bag being full.

The user can now put the pet waste into the bag using a small shovel, gloves or other means. Then, the housing 12 is pushed back causing the frame 20 as shown in FIG. 5. This motion causes the bag 18 to be closed. The user can now take the device 10 with the bag to a garbage box where he can remove the bag from the elements 42 and discard it. Once bag 18 is removed, the frame 20 is retrieved or pulled back into sleeve 17, and the sleeve is retracted into body 12.

Before or as the sleeve 17 is pulled back into the body, it should be loaded with another bag 18. This step may be accomplished by rotating the sleeve slightly about its axis so that its opening 34 matches up with the slit 36. This can be done by hand, or by other automatic means, such as a clutch mechanism incorporated into the sleeve 14. Once the sleeve is rotated into position, it can then be retracted into the body 12, thereby forcing the next bag 18 to enter through the opening 34 and be engaged or coupled to the frame 20. The final configuration of the device is shown in FIG. 6 and is essentially identical to the configuration of FIG. 1 so that is ready to be reused, as shown in FIG. 7.

The different elements or members of the device 10 can be made from natural and man-made materials including wood, plastic, metal alloys and so on. In a particularly, advantageous embodiment the elements 42 are made of several chain links, and the like.

Moreover, optionally, a string or chain 19 can be attached to the device as well, and used as a leash to control the dog.

Numerous modifications may be made to this invention without departing from its scope as defined in the appended claims.

I claim:

1. A device for collecting animal refuse comprising:
    a tubular housing with a plurality of longitudinal slots holding disposable bags;
    a frame having a folded configuration in which it fits telescopically in the housing and an open configuration when disposed outside the housing, said frame supporting a bag having a lip, said frame opening said bag in said open configuration; and
    a rod having a handle at one end for operation by a user and being connected to the frame at the other end, said rod being used to selectively reciprocate said frame in and out of the housing.

2. The device of claim 1 wherein said frame includes a plurality of linear elements connected end to end to form a polygon in the open configuration.

3. The device of claim 2 wherein said frame further comprises at least one spring arranged to bias said frame toward said open configuration.

4. The device of claim 1 further comprising a sleeve telescopically received inside said housing, said sleeve holding said frame.

5. The device of claim 1 wherein said frame is formed of six linear elements.

6. An animal refuse collecting device comprising:
    a tubular housing with a plurality of longitudinal slots holding disposable bags;
    a frame disposed within said housing and having an open and a folded configuration, said frame being positioned to engage one of said bags; and
    a rod telescopically inserted into said housing, between a first and a second position, for removing said frame from said housing and reinserting said frame into said housing, wherein when said frame is removed, the frame changes to the open configuration thereby opening the bag.

7. The device of claim 6 further comprising a sleeve attached to said rod, said frame being disposed in said sleeve when closed.

8. The device of claim 6 wherein said frame includes a plurality of linear rigid elements connected end to end.

9. The device of claim 8 wherein said frame further comprising coil springs arranged to urge said elements to form a polygon in the open configuration of said frame.

* * * * *